UNITED STATES PATENT OFFICE.

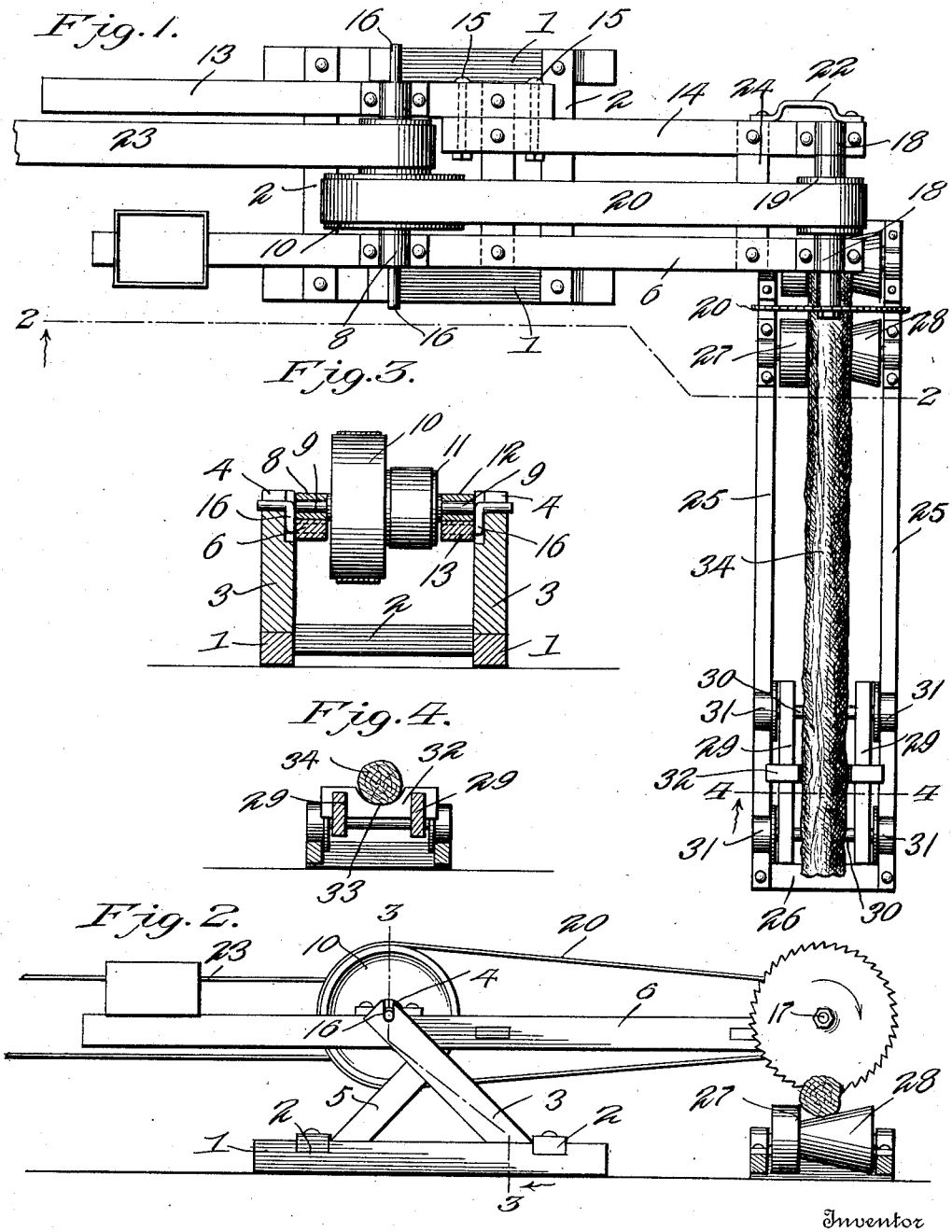

LENARD WOLFE, OF MATTOON, WISCONSIN.

WOOD-SAWING MACHINE.

1,025,773.  Specification of Letters Patent.  Patented May 7, 1912.

Application filed December 7, 1909. Serial No. 531,789.

*To all whom it may concern:*

Be it known that I, LENARD WOLFE, a citizen of the United States of America, residing at Mattoon, in the county of Shawano and State of Wisconsin, have invented new and useful Improvements in Wood-Sawing Machines, of which the following is a specification.

This invention relates to wood sawing machines, and one of the principal objects of the same is to provide a simple machine for sawing wood in which means are provided for feeding a long stick of wood under the saw.

Another object of the invention is to provide a pivoted saw frame having a counterweight, a handle for operating the saw frame and a carriage for the wood mounted upon rails extending at right angles to the saw, said carriage being movable on the rails toward and from the saw.

These and other objects may be attained by means of the construction illustrated in the accompanying drawing, in which,—

Figure 1 is a top plan view of a wood sawing machine made in accordance with my invention. Fig. 2 is a sectional view and side elevation taken on the line 2—2 of Fig. 1. Fig. 3 is a transverse vertical sectional view taken on the line 3—3 of Fig. 2, looking in the direction indicated by the arrow. Fig. 4 is a sectional view on the line 4—4 of Fig. 1, looking in the direction indicated by the arrow.

Referring to the drawing, the numerals 1 designate the base members of the frame, said base members being connected together by transverse braces 2. Connected to the base members are inclined standards 3 each provided with a vertical notch 4 in its upper end. Braces 5 secured to the base members at their lower ends serve to support the standards in position. The saw frame comprises the counterbalanced member 6 having a box supported upon its rear end for containing a weight to serve as a weight to counterbalance the saw frame, said member being provided with a bearing 8 for a shaft 9, said shaft carrying a belt pulley 10 and a smaller belt pulley 11. The opposite end of the shaft 9 is mounted in a similar bearing 12 secured to a bar 13, said bar having connected to its front end a frame bar 14 by means of screw bolts 15. The saw frame is supported upon the standards 3 by means of pintles 16, said pintles having two members projecting in opposite directions in different parallel planes. These pintles are secured at one end in the bars 6 and 13, while the opposite ends are supported in the notches 4 in the standards 3, thus throwing the saw frame below its pivotal points. The saw arbor 17 is mounted in keepers 18 on the outer end of the bars 6 and 14, said arbor being provided with a pulley 19 around which a belt 20 passes, said belt also passing around the pulley 10 on the shaft 9. The saw 21 is disposed at one side of the bar 6, and a handle 22 is secured to the bar 14 for raising and lowering the saw and controlling its action. A belt 23 passes around the small pulley 11 on the shaft 9, said belt being connected to an engine or other source of power. The bars 6 and 14 are provided with a cross brace 24, and extending out from one side of the bar 6 is a pair of rails 25 connected together at their outer ends by a brace 26. Journaled between the rails 25 is a roller provided with a head 27 and a connected frusto-conical body 28. A similar roller is journaled upon the rails 25 at the opposite side of the saw 20. A carriage is mounted on the rails 25, said carriage comprising side rails 29 in which are mounted shafts 30 carrying track wheels 31 adapted to ride on the rails 25. Extending across from one of the side rails 29 to the other is a supporting member 32 having a curved central recess 33 therein to accommodate a log 34, said log resting at its other end upon the frusto-conical body 28 and against the head 27 of the roller.

The operation of my invention may be briefly described as follows:—The sawyer stands at a point near the handle 22 which he grasps and regulates the movement of the saw frame and saw. Another operator moves the log 34 toward the saw at each operation, while another operator fetches the logs and places them upon the carriage and upon the roller.

From the foregoing it will be obvious that my invention is comparatively simple in construction, can be operated by two or three men to advantage and will saw a large quantity of wood in a comparatively short time.

I claim:—

In a wood sawing machine, a supporting frame having side members provided with vertical slots, supporting beams, cranked rods secured to said supporting beams and having their outer ends journaled in and removable from the vertical slots for pivotally supporting said beams on said supporting frame, a shaft journaled on the forward ends of said supporting beams, a shaft journaled on the central portions of said supporting beams in alinement with the journaled ends of said rods, pulleys on the shafts, a drive belt movable over the pulleys, a saw mounted on the first shaft, means for feeding a log to be cut to the saw and a weight adapted to balance said beams, said cranks serving to support said beams whereby the saw may be moved vertically against the log to be cut and moved horizontally.

In testimony whereof I affix my signature in presence of two witnesses.

LENARD WOLFE.

Witnesses:
LEWIS PETERSON,
W. T. PAHR.

Copies of this patent may be obtained for five cents each, by addressing the "Commissioner of Patents. Washington, D. C."